US008770083B1

(12) United States Patent
Hatfield et al.

(10) Patent No.: US 8,770,083 B1
(45) Date of Patent: Jul. 8, 2014

(54) QUICK RELEASE FLARE TUBE ADAPTER

(71) Applicants: Charles A. Hatfield, Virginia Beach, VA (US); Thomas Morrow, Acton, CA (US); Alexander Brown, Coconut Creek, FL (US); Trent Meyers, Savannah, GA (US); Katie Spira, Sanger, TX (US)

(72) Inventors: Charles A. Hatfield, Virginia Beach, VA (US); Thomas Morrow, Acton, CA (US); Alexander Brown, Coconut Creek, FL (US); Trent Meyers, Savannah, GA (US); Katie Spira, Sanger, TX (US)

(73) Assignee: The United States of America, as Represented by the Secretary, Department of Homeland Security, Washington, DC (US)

( * ) Notice: Subject to any disclaimer, the term of this patent is extended or adjusted under 35 U.S.C. 154(b) by 0 days.

(21) Appl. No.: 13/767,304

(22) Filed: Feb. 14, 2013

(51) Int. Cl.
*B64D 7/00* (2006.01)
*B64D 1/02* (2006.01)

(52) U.S. Cl.
CPC ....................................... *B64D 1/02* (2013.01)
USPC .............................. 89/1.51; 87/1.54; 87/37.16

(58) Field of Classification Search
CPC .............. B64D 1/00; B64D 1/02; B64D 1/04; B64D 1/06; B64D 1/10; B64D 7/00; B64D 7/02; B64D 7/04; B64D 7/06; B64D 7/08
USPC ................ 89/1.51, 1.54, 37.16, 37.17, 37.19, 89/41.21
See application file for complete search history.

(56) References Cited

U.S. PATENT DOCUMENTS

| | | | | |
|---|---|---|---|---|
| 1,847,545 A | * | 3/1932 | Wiley | 89/1.52 |
| 1,996,694 A | * | 4/1935 | Wiley | 89/1.58 |
| 2,000,055 A | * | 5/1935 | Wiley | 102/337 |
| 2,400,322 A | * | 5/1946 | Wheeler | 89/37.19 |
| 2,421,491 A | * | 6/1947 | Gearon et al. | 89/1.1 |
| 2,956,478 A | * | 10/1960 | Ream, Jr. et al. | 89/1.815 |
| 4,364,517 A | * | 12/1982 | Etheridge et al. | 239/171 |
| 5,381,721 A | * | 1/1995 | Holmstrom et al. | 89/1.51 |
| 6,820,532 B2 | * | 11/2004 | Sanderson | 89/41.18 |
| 8,132,492 B1 | * | 3/2012 | Brum et al. | 89/1.54 |
| 8,434,397 B1 | * | 5/2013 | Deckard et al. | 89/37.16 |
| 2004/0216596 A1 | * | 11/2004 | Isker et al. | 89/37.16 |

* cited by examiner

*Primary Examiner* — Bret Hayes
*Assistant Examiner* — Joshua Freeman
(74) *Attorney, Agent, or Firm* — Lavanya Ratnam; William Washington (57) ABSTRACT

A quick release illumination flare mounting arrangement particularly adapted for use in an aircraft. Includes a base plate mounted to the aircraft's deck, and an aperture in sealed contact with an upper end of a flare discharge tube coupled to a discharge aperture in the fuselage. A coupling assembly which includes a second aperture is easily coupled to and removed from the base plate by coupling pins. The coupling assembly further includes an upper plate adapted for secure, sealed, easily removable mounting to the lower end of a flare receiving tube.

16 Claims, 8 Drawing Sheets

QUICK RELEASE FLARE TUBE ADAPTER

FIELD OF THE INVENTION

This invention relates generally to an arrangement for discharging illumination flares from an airborne aircraft such as for use in nighttime search and rescue missions, and is particularly directed to a removable mounting adaptor for an aircraft flare discharge tube.

BACKGROUND OF THE INVENTION

Aircraft are frequently used in conducting search and rescue, law enforcement and reconnaissance missions by military, police and para-military organizations. These missions are frequently over water and include the use of aircraft employing various detection and observation technologies. When this type of mission is conducted at night, the aircraft is provided with flares or floodlights to enhance air crew visibility.

Illumination flares are typically discharged from a lower portion of the aircraft's fuselage into the airstream by means of a flare launch tube system. The flare launch tube system provides a seal between the environment within the fuselage and the lower pressures and temperatures encountered by an aircraft at altitude.

Figure 1:
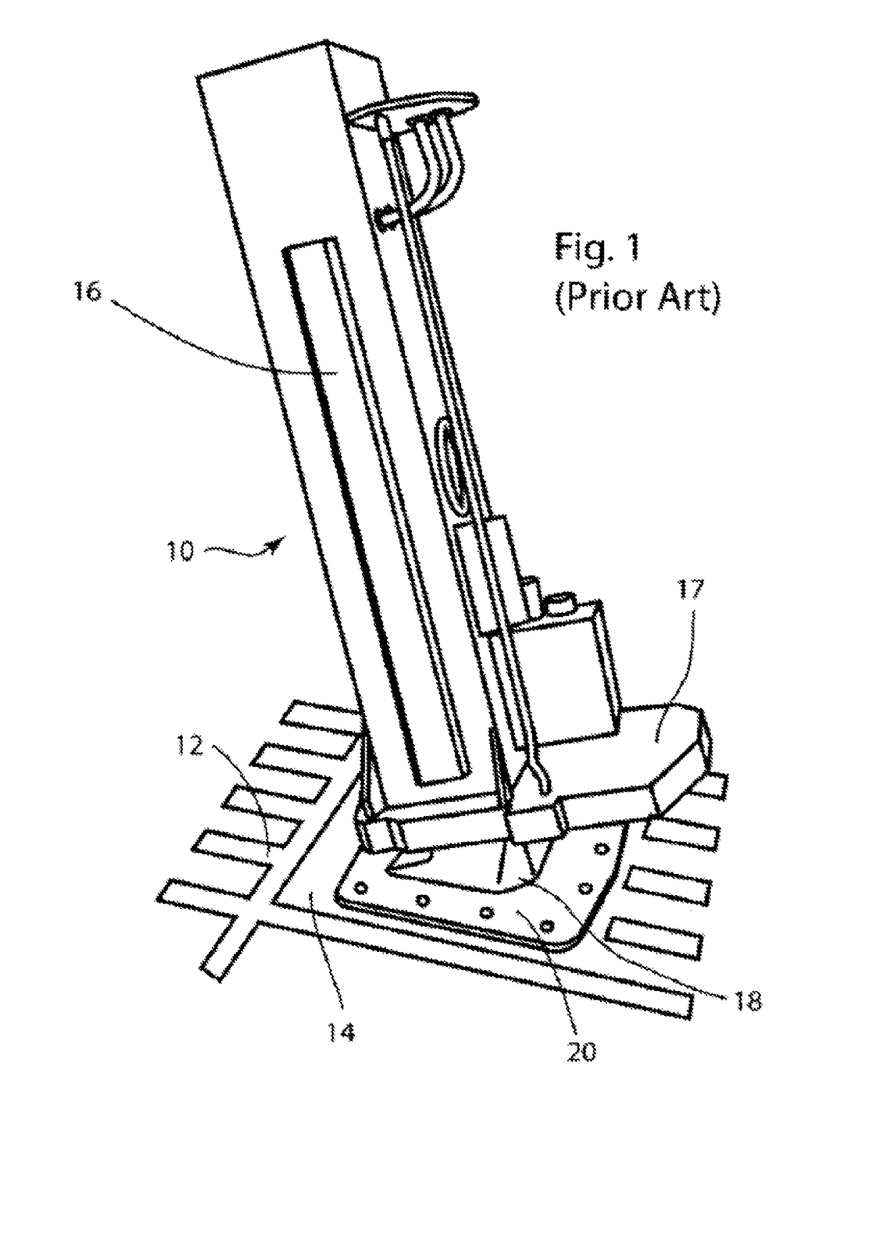
FIG. 1 is a perspective view of an existing prior art flare tube installation for use in an aircraft.

Referring to FIG. 1, there is shown an upper perspective view of a flare tube installation 10 currently in use. The prior art flare tube installation 10 is adapted for mounting to a deck plate 14 attached to the aircrafts's deck, or floor, 12. The flare tube installation 10 includes an upper flare tube 16 attached to a lower mounting plate 17. Lower mounting plate 17 is adapted for secure coupling to an upper portion of a mounting assembly 18 by means of plural threaded members such as screws or bolts. A lower portion of mounting assembly 18 is similarly adapted for attachment to deck plate 14 by means of plural spaced threaded members. Aligned apertures within the upper flare tube 16, the lower mounting plate 17 and the mounting assembly 18 receive the flare and allow for its discharge from the aircraft.

Figure 2:
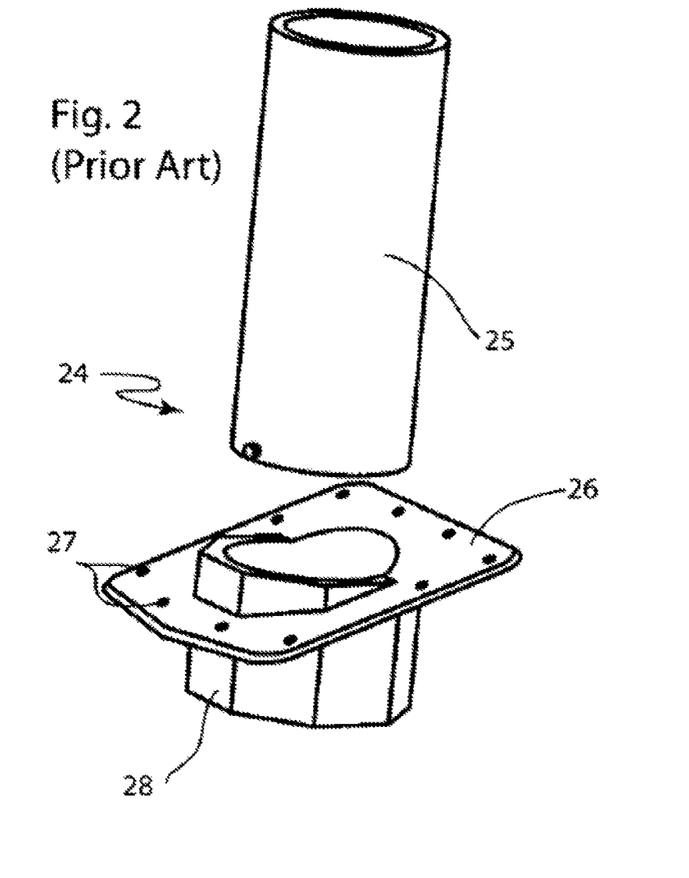
FIG. 2 is a partially exploded perspective view illustrating the general design and configuration of a prior art aircraft flare tube installation showing additional details of the installation.

Referring to FIG. 2, there is shown a simplified perspective view of a portion of a flare tube installation 24 which includes a flare tube 25 and the flare tube's base plate 26 which is adapted for secure attachment by means of plural threaded members 27 to the aircraft's deck (not shown for simplicity in the figure). Other components of the flare tube installation 24 are omitted from FIG. 2 to simplify the illustration because this figure is included to show that a lower end of flare tube 25 is continuous with and connected to an upper end of a main discharge tube 28. The main discharge tube 28 is disposed between the aircraft's deck and a lower portion of its fuselage to allow for discharge of a flare from the aircraft. It should also be noted that is the flare tube 16 is oriented at an inclined angle relative to the aircraft's deck 12 for directing a discharged flare in a rearward direction relative to the direction of travel.

As not all missions require the use of flares, the flare tube installation shown in FIG. 1 allows for removal of the flare tube 16 when not in use. However, the flare tube 16 is not easily removed, or installed, because of the number of system components which must be manipulated and the limited accessibility to these components. With the flare tube 16 removed, the remaining portion of the installation restricts the use of that portion of the aircraft's deck and the space above the flare tube's base plate 20. In addition, frequent removal of the flare tube 16 is necessary because an illumination flare capability is not necessary for all aircraft missions and the space occupied by the flare tube can generally be used in carrying out other aircraft missions. For example, the limited deck space in an aircraft requires that the flare tube installation be located adjacent a crew member station and in front of a door in the fuselage. This arrangement restricts the observation capability of a crew member through a fuselage window, as well as access into or out of the aircraft emergency door. Finally, when the airborne flare launch system is used for marking positions in search and rescue missions, it typically is necessary to re-configure the aircraft to install the flare launch system on an expedited basis which places ease of installation of the system with minimum time at a premium.

The present invention is directed to a quick release flare tube mounting arrangement particularly adapted for use in an aircraft which simplifies and reduces the time to install or remove a flare release tube within the fuselage of an aircraft, and does not prevent, or restrict, the use of the aircraft deck and space occupied by the removed flare release tube in carrying out other activities necessary for other missions.

OBJECTS AND SUMMARY OF THE INVENTION

Accordingly, it is an object of the present invention to provide a mounting arrangement for a flare discharge tube such as for use in an aircraft which is easily and quickly installed or removed, has a small footprint, is capable of accommodating temperature and pressure differentials encountered in an airborne environment in a sealed manner, and does not restrict movement or limit usable space within the aircraft when the flare discharge tube is removed.

It is another object of the present invention to provide a quick release flare tube adapter particularly adapted for use in an aircraft which can be manually installed or removed without the use of tools.

It is a further object of the present invention to provide a replacement flare launch tube arrangement for existing installations which does not require or involve modification to, or re-design of, the aircraft or the existing flare launch tube installation.

The present invention is directed to apparatus for mounting a removable flare tube to the deck of an aircraft, wherein a flare is discharged from the aircraft via a main tube disposed between the aircraft deck and the aircraft fuselage, the apparatus comprising a lower mounting assembly attached to an upper surface of the aircraft deck and having a first aperture aligned and in contact with an upper end of the main tube, the lower mounting assembly further including plural spaced first outer lugs each having a respective first slot therein; an upper mounting assembly disposed on an upper portion of said lower mounting assembly and having a second aperture therein, wherein said second aperture is aligned and continuous with said first aperture, said upper mounting assembly further including an upper mounting plate disposed about said second aperture and adapted for sealed coupling to a lower end of the flare tube, wherein said aligned first and second apertures are adapted for directing a flare discharged from the flare tube to said main tube, said upper mounting assembly further including plural spaced second outer lugs each having a respective second slot therein, wherein each of said second lugs is adapted for alignment and tight-fitting positioning with a respective one of said first lugs with their respective first and second slots aligned with one another; a seal member disposed between and in contact with the lower mounting assembly and the upper mounting assembly; plural coupling pins each adapted for tight-fitting insertion in a pair of aligned first and second slots disposed in respective first and second lugs for securely connecting said lower and upper mounting assemblies together in a sealed, removable manner.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 3:
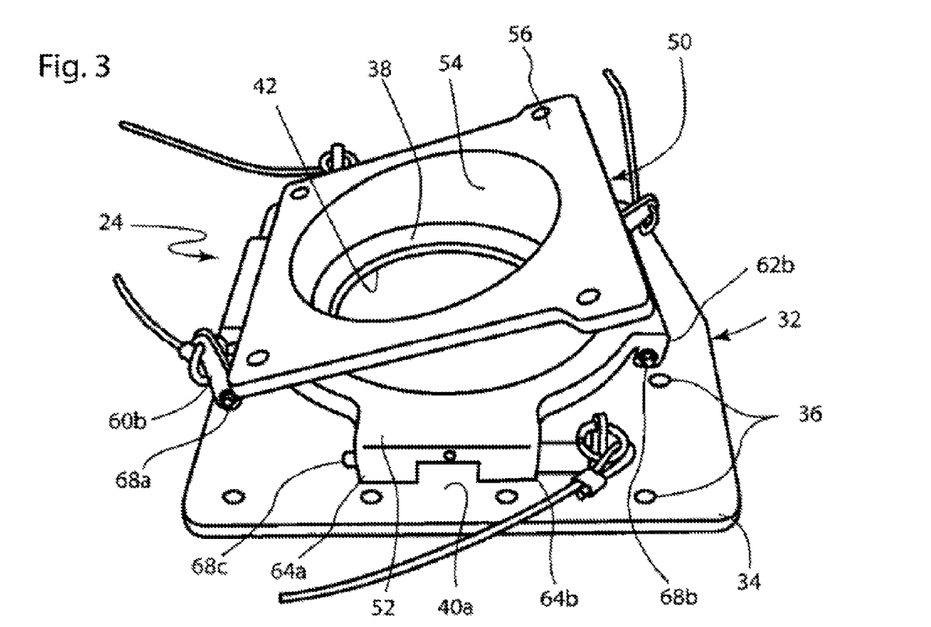
FIG. 3 is an upper perspective view of an aircraft flare tube installation arrangement in accordance with the principles of the present invention.
Figure 4:
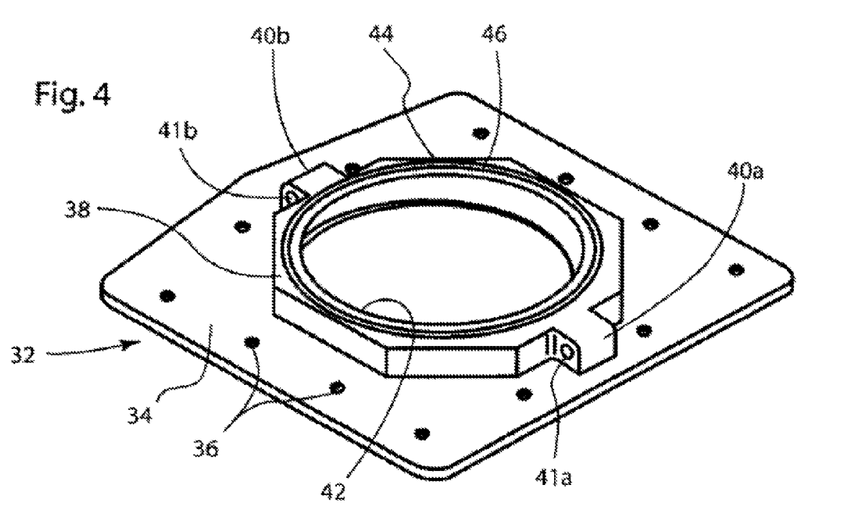
FIGS. 4 and 5 are respectively upper perspective and top plan views of a lower mounting assembly for use in the flare tube installation arrangement of FIG. 3.
Figure 5:
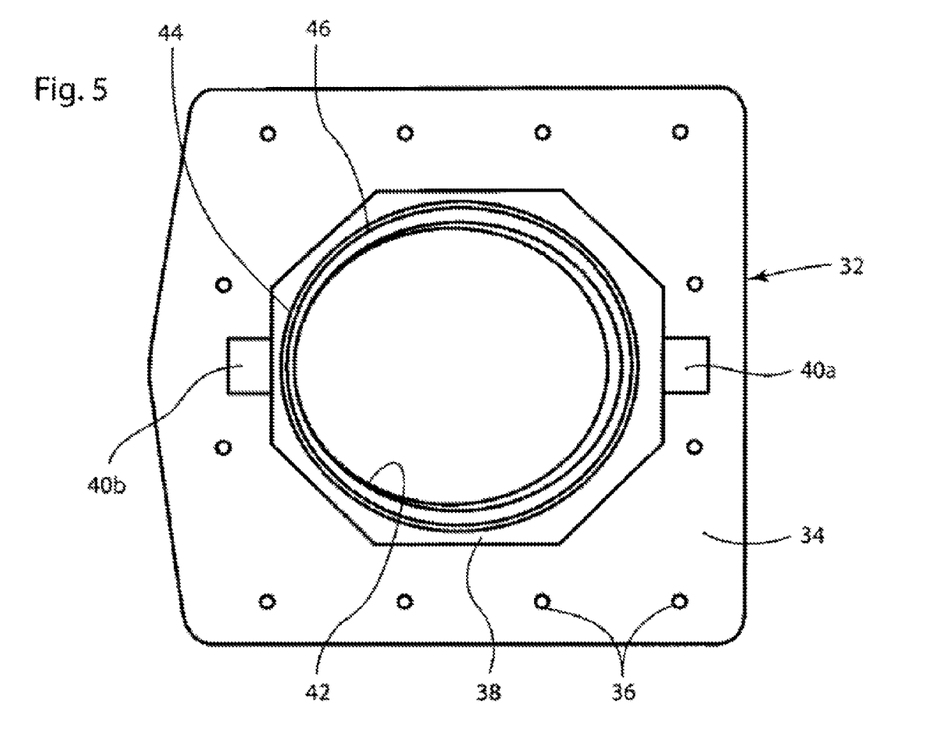
Figure 6:
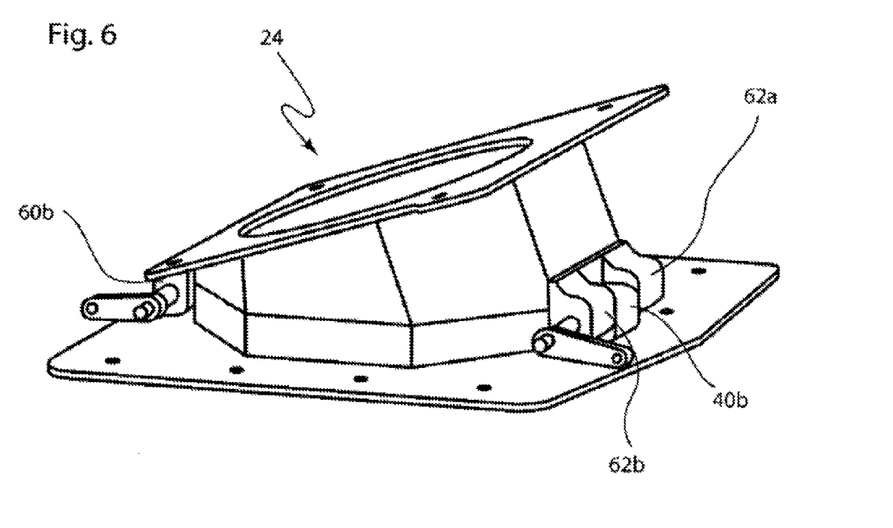
FIGS. 6 and 7 are perspective views of the flare tube installation arrangement of the present invention.
Figure 7:
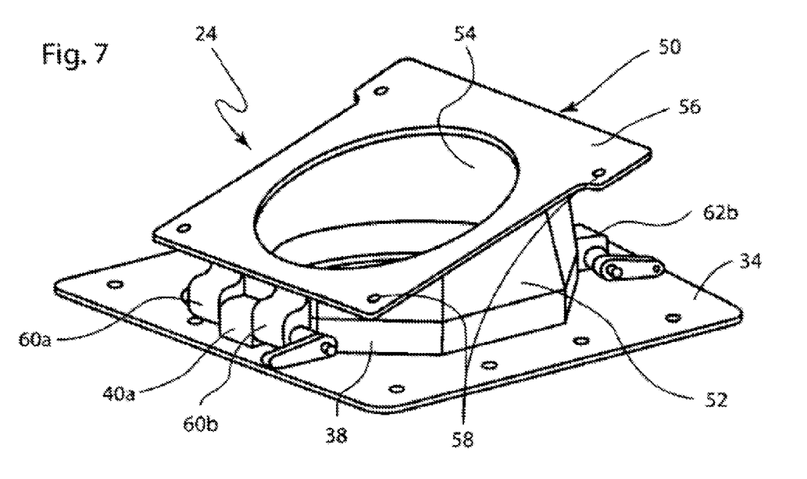

With reference to FIGS. 3-7, the structure and function of the flare tube installation 24 of the present invention will now be described in detail. FIG. 3 is an upper perspective view of the inventive flare tube installation 24. FIGS. 4 and 5 are respectively upper perspective and top plan views of a lower mounting assembly 32 used in the inventive flare tube installation 24. FIGS. 6 and 7 are upper perspective views of the inventive flare tube installation 24.

Figure 8:
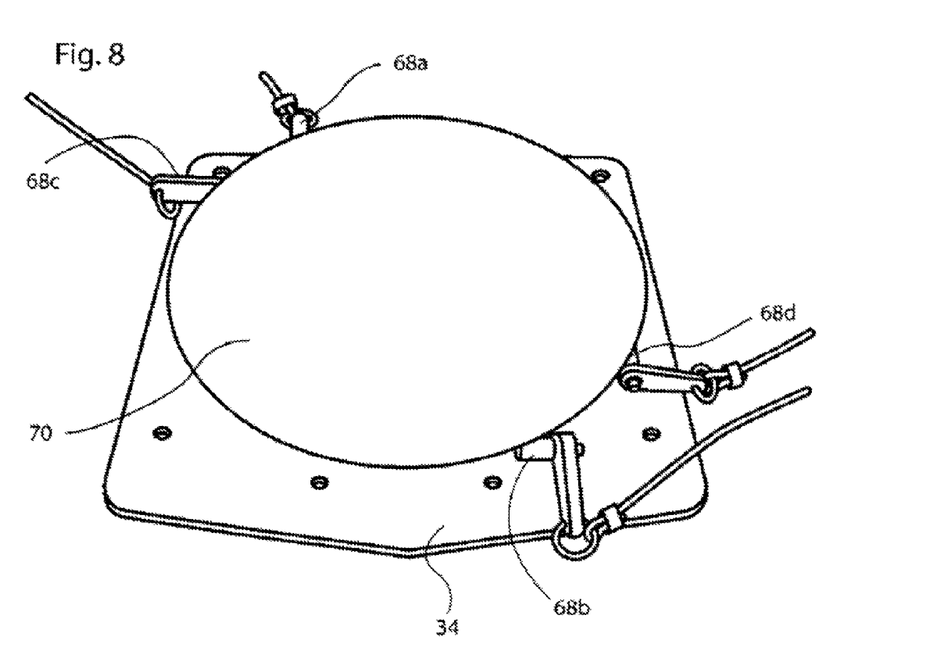
FIG. 8 is an upper perspective view of the flare tube installation arrangement of the present invention with its removable cover, or blanking, plate in position on an upper portion of the installation.

The following paragraphs describe two embodiments of the present invention which are functionally equivalent from a patent standpoint. One embodiment is illustrated in FIGS. 3 and 8 and includes four pairs of lugs formed in and extending outwardly from a second hollow cylinder 52 which is attached to an upper surface of a base plate 34 by means of a first hollow cylinder, or base mount, 38, where two and a half of these pairs of lugs are shown as elements 64a, 64b and 62b in FIG. 3. The other embodiment is illustrated in FIGS. 4-7 and includes only two pairs of lugs 60a, 60b and 62a, 62b shown in the combination of FIGS. 6 and 7, and only two lugs 40a and 40b extending from the first hollow cylinder 38, where both of these lugs are shown in FIG. 4. Because these elements perform the same function in the same manner in both embodiments, the same elements in both embodiments are designated with the same element identifying numbers in the following description of the invention.

Flare tube installation 24 includes a lower mounting assembly 32 and an upper mounting assembly 50. Lower mounting assembly 32 includes a generally flat base plate 34 having plural spaced apertures 36 therein which are adapted to receive threaded coupling members, such as screws or bolts, for securely attaching base plate to the aircraft's deck, which is not shown for simplicity in FIGS. 3-7, but is illustrated in FIG. 1 and described above. Disposed within base plate 34 is a generally circular aperture 42. Disposed on an upper surface of base plate 34 and positioned about aperture 42 therein is a base mount 38. Base mount 38 extends upwardly from the upper surface of base plate 34 and is on the order of 1" in height in a preferred embodiment. Disposed in an upper surface of base mount 38 is an annular groove, or recess, 44 which is positioned concentrically about the first circular aperture 42 within the base mount. Disposed within the recessed annular groove 44 is an O-ring 46 for forming sealed contact between base mount 38 and an upper mounting assembly 50 as described in detail below. Also disposed on the outer, lateral surface of base mount 38 are plural spaced first through fourth lugs 40a-40d. As noted above, the embodiment illustrated in FIGS. 4-7 includes only a pair of lugs 40a and 40b disposed on opposed, outer lateral portions of the base mount 38. Each of the first through fourth lugs 40a-40d includes a respective elongated cylindrical opening, or slot, therein which extends parallel to the plane of base plate 34. The slots in each of lugs 40a-40d, as well as the slots in other lugs discussed below, preferably include any inner sleeve comprised of stainless steel for corrosion protection. The upper surface of base plate 38 is adapted to receive a lower portion of the upper mounting assembly 50 of the flare tube installation 24.

Upper mounting assembly 50 includes a second hollow cylinder 52, the lower surface of which is adapted for positioning upon the upper surface of the lower mounting assembly's first hollow cylinder 38 as shown in FIGS. 3, 6 and 7. The second hollow cylinder 62 includes an inner circular aperture 54 which is aligned and continuous with the circular apertures in the first hollow cylinder 38 and in base plate 34. The upper surface of the second hollow cylinder 52 is disposed at an inclined angle relative to base plate 34 of the aircraft's deck. Disposed on the upper end of the second hollow cylinder 52 is an inclined upper mounting plate 56 having plural spaced apertures 58 therein for facilitating attachment of upper mounting plate to a lower end portion of a flare tube 16 such as shown in FIG. 1.

Disposed in a spaced manner about the outer, lateral periphery of a lower portion of the second hollow cylinder 52 are four pairs of spaced mounting lugs, where two of these pairs are shown as elements 64a and 64b in the embodiment shown in FIG. 3 and as elements 60a and 60b in the embodiment shown in FIG. 7, which also illustrates a third mounting lug as element 62b. Again, the embodiment of the invention illustrated in FIGS. 3-7 includes only a pair of mounting lugs shown as elements 40a and 40b. Each spaced pair of lugs 60a, 60b and 64a, 64b extends below the lower edge, or surface, of the second hollow cylinder 52 to which these pairs of mounting lugs are attached. Each of the four spaced mounting lugs 40a-40d disposed on the outer periphery of base mount 38 is adapted for positioning in a tight fitting manner between a respective pair of spaced lugs disposed on the lower outer peripheral surface of the second hollow cylinder 52. Thus, the first through fourth mounting lugs disposed on base mount 38 are adapted for positioning between respective pairs of mounting lugs disposed on the outer lateral surface of the second hollow cylinder 52. With each of the first through fourth mounting lugs disposed between a respective pair of the first through fourth pairs of spaced lugs, and with the respective apertures within the adjacent spaced mounting lugs in common alignment, each set of aligned mounting lugs is adapted to receive a respective mounting pin for securely and fixedly attaching the second hollow cylinder 52 to an upper surface portion of the base mount 38. Thus, a first coupling pin 68a is adapted for coupling lug 40a to paired lugs 60a and 60b, while a second coupling pin 68b is adapted for coupling lug 40b to paired lugs 62a and 62b. Similarly, third and fourth coupling pins 68c and 68d are adapted for insertion through and coupling the two remaining lugs on first hollow cylinder, or base mount, 38 to the two remaining pairs of lugs on second hollow cylinder 52. Each of the coupling pins 48a-48d includes a tapered end portion to facilitate insertion of the coupling pin into the aligned apertures of the adjacent mounting lugs. It is in this manner that the upper mounting assembly 50 and a flare tube attached thereto may be easily and quickly attached to and removed from the lower mounting assembly 32 which is attached to the aircraft deck.

Referring to FIG. 8, there is shown an upper perspective view of a cover, or blanking, plate 70 disposed on and coupled to the lower mounting assembly 32. Cover plate 70 is adapted for secure, easily removable direct coupling to the base mount 38 of the lower-mounting assembly 32 (which is not shown in FIG. 8 for simplicity), in the same manner as the attachment of the second hollow cylinder 52 to the base mount as discussed above. That is, plural coupling pins 48a-48d are inserted through aligned apertures in each of lugs 40a-40d as well as through aligned apertures in a respective pair of lugs, not shown in FIG. 8 for simplicity, but which are the same as the mounting lugs shown in FIGS. 6 and 7, for securely coupling cover plate 70 to the base mount 30 of the lower mounting assembly 32 in an easily installed and removable manner. With cover plate 70 installed on an upper surface of base plate 34, the cover plate provides the combination of base mount 38 and the base plate with a very low profile for facilitating movement of items over the cover plate, while minimizing the possibility of the remaining portion of the flare mounting arrangement still attached to the aircraft's deck interfering with either crew member movement and activity, or equipment movement over the aircraft deck. Also shown in FIG. 8, as illustrated in FIG. 3, are plural combinations of retaining rings and wires 68a-68d each coupled to a respective one the coupling pins 48a-48d for attaching each of the coupling pins to an inner portion of the aircraft's fuselage to ensure that each of the coupling pins remains in place adjacent to the location of the quick release flare tube mounting arrangement to prevent misplacement of the coupling pins.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper prospective based on the prior art.

What is claimed is:

1. Apparatus for mounting a removable flare tube to the deck of an aircraft, wherein a flare is discharged from the aircraft via a main tube disposed between the aircraft deck and the fuselage of the aircraft, said apparatus comprising:

a lower mounting assembly attached to an upper surface of the aircraft deck and having a first aperture aligned and in contact with an upper end of the main tube, said lower mounting assembly further including plural spaced first outer lugs each having a respective first slot therein;

an upper mounting assembly disposed on an upper portion of said lower mounting assembly and having a second aperture therein, wherein said second aperture is aligned and continuous with said first aperture, said upper mounting assembly further including an upper mounting plate disposed about said second aperture and adapted for sealed coupling to a lower end of the flare tube, wherein said aligned first and second apertures are adapted for directing a flare discharged from the flare tube to said main tube, said upper mounting assembly further including plural spaced second outer lugs each having a respective second slot therein, wherein each of said second lugs is adapted for alignment and tight-fitting positioning with a respective one of said first lugs with their respective first and second slots aligned with one another;

a seal member disposed between and in contact with said lower mounting assembly and said upper mount assembly; and plural coupling pins each adapted for tight-fitting insertion in a pair of aligned first and second slots disposed in respective first and second lugs for securely connecting said lower and upper mounting assemblies together in a sealed, removable manner.

2. The apparatus of claim 1, wherein each of said second lugs includes a respective pair of third and fourth lugs each adapted for tight-fitting positioning on opposed sides of a respective first lug, with the apertures of associated first, third and fourth lugs aligned and adapted to receive a respective coupling pin in tight-fitting engagement.

3. The apparatus of claim 1, wherein said lower mounting assembly includes a generally planar base plate attached to an upper surface of the aircraft deck, and wherein said lower mounting assembly further includes a base mount attached to and extending upwardly from an upper surface of said base plate and adapted to receive said upper mounting assembly in tight-fitting engagement.

4. The apparatus of claim 3, wherein said base plate and said base mount have respective aligned, adjacent apertures forming the first aperture in said lower mounting assembly.

5. The apparatus of claim 4, wherein an upper surface of said base mount includes, in combination, a recessed slot and a compressible, resilient first seal member disposed within said slot for forming a tight seal between said lower and upper mounting assemblies.

6. The apparatus of claim 5, wherein said seal member is comprised of silicone or rubber.

7. The apparatus of claim 5, wherein said base mount extends on the order of 1" upwardly from the upper surface of said base plate.

8. The apparatus of claim 1, wherein the upper mounting plate of said upper mounting assembly includes first plural spaced apertures each adapted to receive a respective threaded coupling member for attaching said upper mounting assembly to the lower end of the flare tube.

9. The apparatus of claim 8, wherein said threaded coupling members are screws or nut and bolt combinations.

10. The apparatus of claim 1, wherein the apparatus is comprised of a lightweight, high strength metal.

11. The apparatus of claim 10, wherein said metal is aluminum.

12. The apparatus of claim 11, further comprising stainless steel inner sleeves disposed within the apertures of said first and second lugs to prevent corrosion of the aluminum lugs.

13. The apparatus of claim 1, wherein with all but one of the coupling pins removed from adjacent first and second lugs, the flare tube is adapted for pivoting displacement about the remaining coupling pin attached to adjacent first and second lugs for assuming a folded position generally parallel, and in closely spaced relation, to the aircraft's deck.

14. The apparatus of claim 1 further comprising a cover plate including plural third lugs each adapted for tight-fitting positioning in contact with a respective adjacent first lug on said lower mounting assembly, wherein each third lug is adapted, with said upper mounting assembly and flare tube removed, to receive with an adjacent first lug a respective coupling pin for securely maintaining said cover plate on said lower mounting assembly in a sealed manner.

15. The apparatus of claim 1 further comprising a compressible resilient second seal disposed between and in tight fitting contact with said lower mounting assembly and said aircraft deck.

16. The apparatus of claim 1 further comprising a compressible, resilient third seal disposed between and in tight fitting contact with said upper mounting assembly and the lower end of said main tube.

\* \* \* \* \*